Patented Mar. 22, 1932

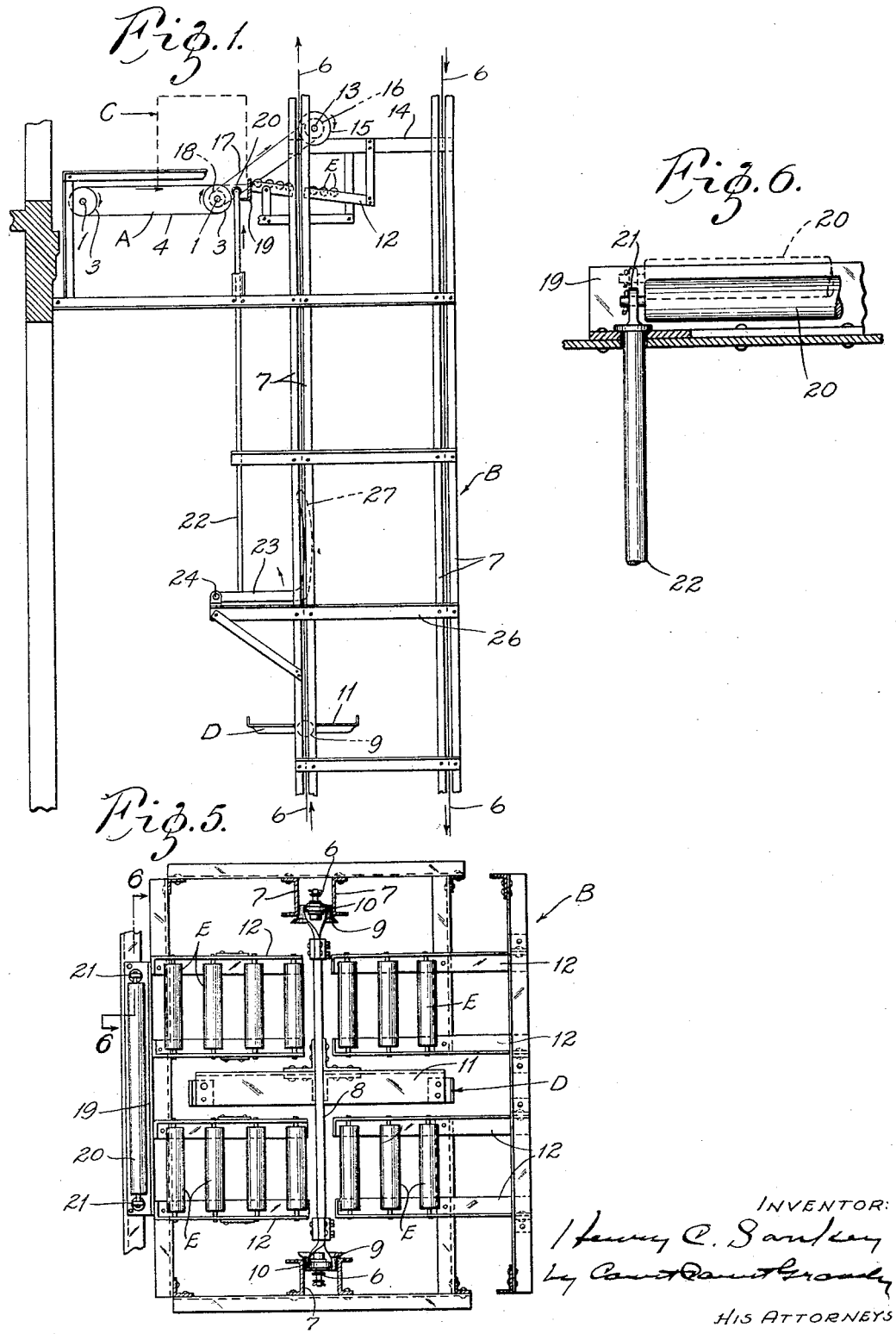

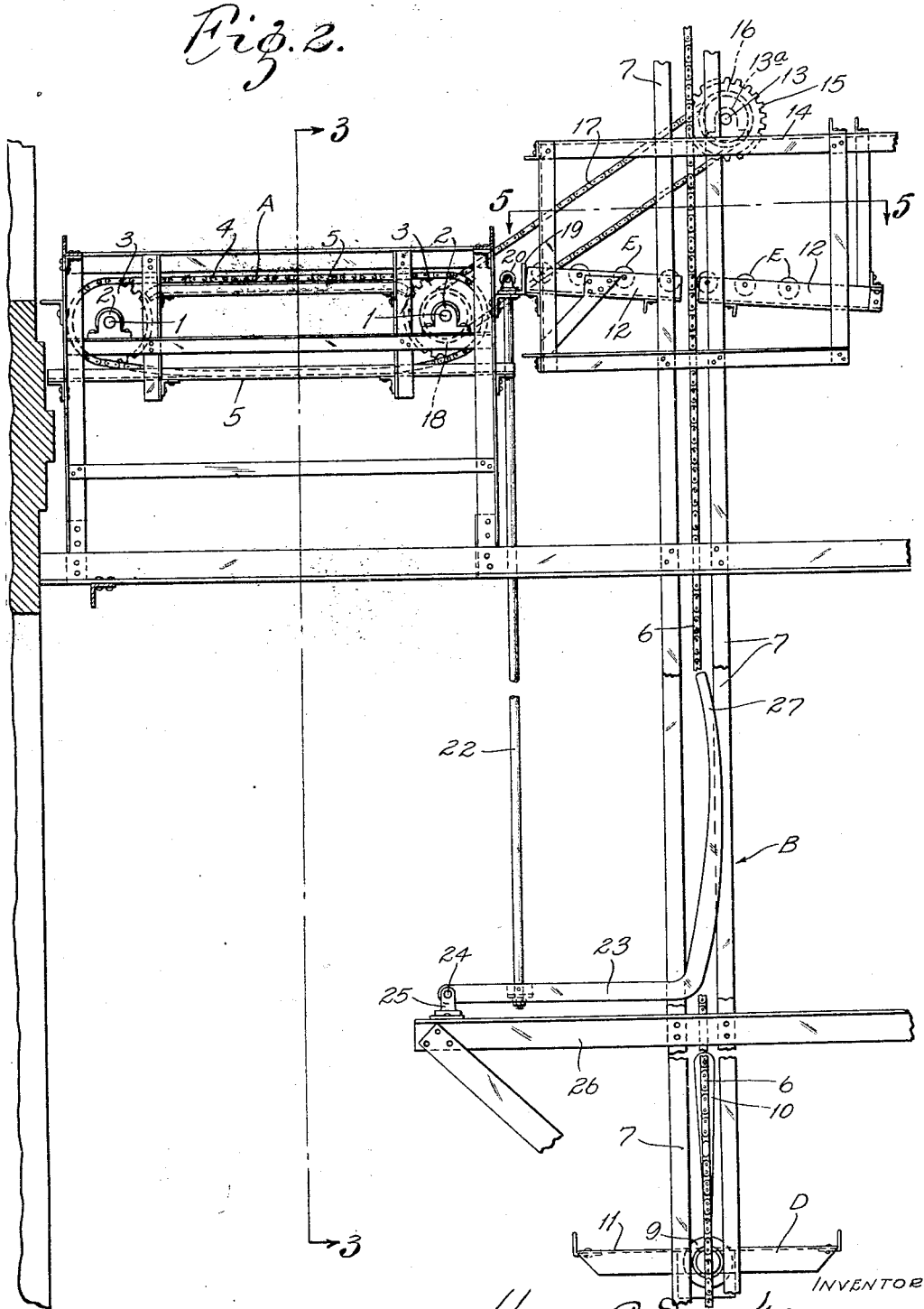

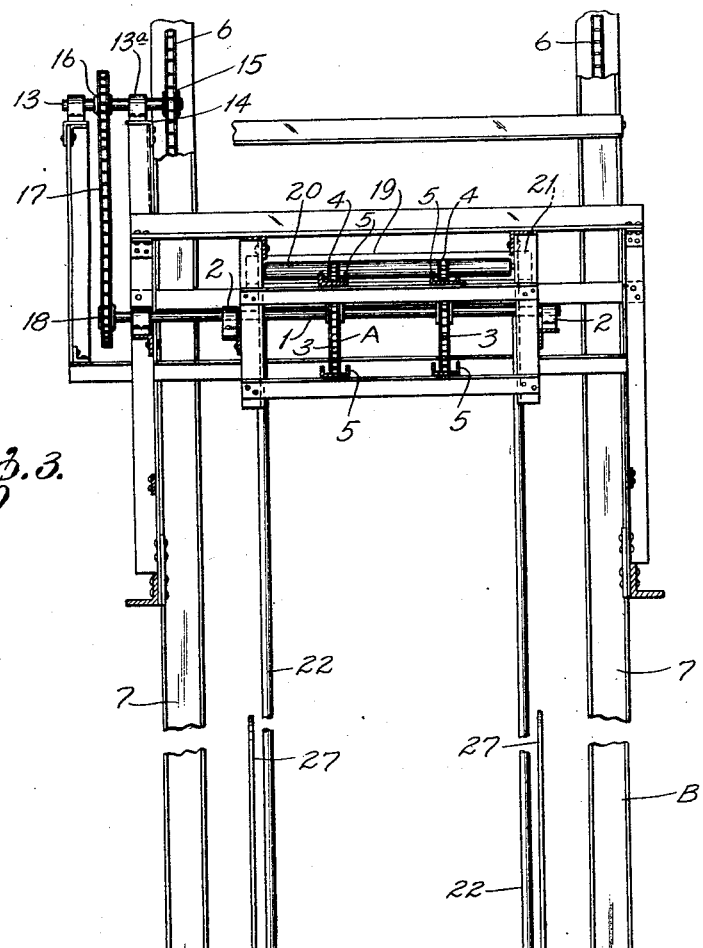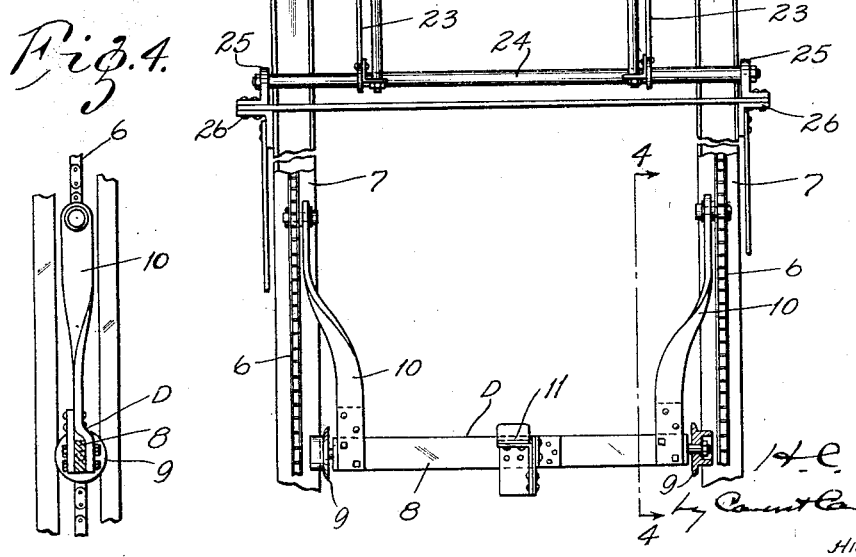

1,850,418

UNITED STATES PATENT OFFICE

HENRY C. SANKEY, OF ST. LOUIS, MISSOURI, ASSIGNOR TO ALVEY MANUFACTURING COMPANY, OF ST. LOUIS, MISSOURI, A CORPORATION OF MISSOURI

FEED REGULATING DEVICE FOR ELEVATORS

Application filed January 31, 1929. Serial No. 336,471.

This invention relates to automatic package conveyors and more particularly to mechanism for regulating the feed of the packages from a horizontal conveyor to a vertical conveyor or elevator.

One of the principal objects of the present invention is to provide a simple and efficient mechanism operatively connected and correlated with the elevator mechanism so that packages are fed one at a time to the carriers of the elevator as they come successively into receiving relation to the horizontal conveyor. Other objects are simplicity of construction, reduced cost of manufacture, fewness of parts and compactness of design.

The invention consists principally in the feed regulating mechanism and in the combinations and arrangements of parts hereinafter described and claimed.

In the accompanying drawings, which form part of this specification and wherein like symbols refer to like parts wherever they occur, Fig. 1 is a side elevation of the adjacent portions of a package elevator and a horizontal conveyor provided with a feed regulating mechanism embodying my invention;

Fig. 2 is an enlarged side elevation of the adjacent portions of the elevator and the horizontal conveyor;

Fig. 3 is a vertical section through the horizontal conveyor, the adjacent portion of the elevator being shown in front elevation;

Fig. 4 is a vertical section through one of the carriers of the elevator on the line 4—4 in Fig. 3;

Fig. 5 is a horizontal cross-section through the elevator, the section being taken adjacent to the loading station of the elevator on the line 5—5 in Fig. 2; and Fig. 6 is a vertical section on the line 6—6 in Fig. 5.

The accompanying drawings illustrate my invention embodied in a conveying device comprising a transverse or horizontal conveyor A and a power driven package elevator B adapted to receive packages C from said horizontal conveyor.

The horizontal conveyor A is of any suitable type, the construction illustrated herein comprising a suitable angle iron framework which supports two laterally spaced horizontal shafts 1 that are journaled in bearings 2 provided therefor in said framework. Sprocket wheels 3 are fixed to each of the shafts 1, the sprocket wheels on one shaft being connected to the sprocket wheels on the other shaft by endless drag-link conveyor chains 4. The upper stretches of the endless conveyor chains 4 of the horizontal conveyor A travel in the direction of the elevator B so as to convey packages that are deposited thereon to said elevator. As shown in the drawings, the framework of the horizontal conveyor A is provided with channels 5 for supporting the upper and lower stretches of the endless conveyor chains 4.

The power driven package elevator B, of which only a portion is shown, is of the usual endless chain type and comprises carriers or traveling platforms D supported between a pair of endless sprocket chains 6, which are vertically arranged in parallel planes and spaced apart horizontally. The sprocket chains 6 travel between vertical guides 7, which form part of the elevator framework. Each carrier D comprises a bottom cross-bar 8 provided at each end with a flanged wheel 9 adapted to travel between the vertical chain guides 7 of the elevator frame. Each carrier D is suspended between the pair of sprocket chains 6 by hanger bars 10 that are fastened to each end of the bottom cross-bar 8 and are pivotally connected to said sprocket chains. Rigidly attached to the cross-bar 8 intermediate the ends thereof is a horizontal bar 11 which extends cross-wise of the cross-bar 8 and cooperates therewith to form a platform upon which the packages C are loaded. The elevator B is provided opposite the delivery end of the horizontal conveyor A with an inclined bed of rollers E, that is located in the path of the upwardly moving carriers of said elevator. The bed of rollers slopes downwardly from the discharge end of the horizontal conveyor to the center of the elevator; and the rollers E of said bed are disposed transversely of the horizontal conveyor and are rotatably supported between pairs of horizontally spaced angle members 12 that are rigidly secured to the framework of the elevator. As shown in the drawings, the rollers E are arranged so as to permit the package supporting bars 8 and 11 of the upwardly moving carriers D to pass through the bed.

Fixed to a shaft 13 journaled in a horizontal bearing 13a mounted on a cross-member 14 of the framework of the elevator B is a sprocket wheel 15, which meshes with the upwardly moving stretch of one of the endless elevator chains 6 to be rotated thereby. A second sprocket wheel 16 is also fixed to the shaft 13 and is connected by means of an endless sprocket chain 17 to a sprocket wheel 18 fixed on the sprocket wheel shaft 1 located at the delivery end of the horizontal conveyor A. By this arrangement the horizontal conveyor A is driven from the elevator B through the sprocket chain connection 17.

Interposed between the discharge end of the horizontal conveyor A and the inclined bed or rollers E of the elevator B is a stationary package stop. Said package stop preferably consists of a horizontal angle bar 19, which is fixed to the discharge end of the horizontal conveyor A with one flange down and facing said end of said conveyor and with the other flange up and extending far enough above the package supporting surface of said horizontal conveyor to engage the lower corner of the foremost package on said conveyor and thus arrest further travel in the direction of said package. The front end of the package, which has come to rest against the upstanding flange of the stop 19, lies above a horizontal lifting roller 20 that is disposed in the angle formed by the two flanges of said stop and extends longitudinally thereof. The ends of the package lifting roller 20 are journaled in bearings 21 provided therefor on the upper ends of two vertically disposed lifting rods 22. The upper ends of the rods 22 extend through holes provided therefor in the bottom flange of the angle bar stop 19; and the bearings 21 for the lifting roller 20 are located above said bottom flange and are adapted to rest thereon and thus limit the downward movement of said roller. As shown in the drawings, when the bearings 21 for the lifting roller 20 are resting upon the bottom flange of the package stop 19, the top of said roller is disposed in the plane of the package supporting surface of the horizontal conveyor A. The vertical supporting rods 22 are slid upwardly through the holes in the base flange of the stop bar 19 to raise the lifting roller supported thereon by means of a pair of lifting arms 23 secured to the lower ends of said rods. The lifting arms 23 are rotatably supported at one end for vertical swinging movement on a horizontal shaft 24 mounted in brackets 25 provided therefor on the ends of horizontal frame members 26 of the elevator framework. The lifting arms 23 extend inwardly towards the upwardly moving carriers D of the elevator B and terminate at their free ends in curved upstanding fingers 27 whose convex surfaces are disposed in the path of the cross bar 8 of the upwardly moving carriers.

The operation of the device is as follows: Packages that are to be delivered to the upwardly moving carriers D of the elevator B are loaded on the receiving end of the horizontal conveyor A and travel along the same until the foremost package comes to rest against the package stop 19 with its front end overhanging the lifting roller 20. When an upwardly moving carrier reaches a position adjacent to the lifting arms 23, the cross bar 8 thereof begins to bear against the convex surfaces of the curved upstanding fingers 27 of said arms, thereby causing said arms to swing upwardly. This upward movement of the arms 23 is transmitted through the lifting rods 22 to the lifting roller 20, which raises the front end of the foremost package above the stop bar 19. The package thus released by lifting roller then moves forwardly over said roller under the influence of the horizontal conveyor A until the center of gravity of said package passes the center of said roller, whereupon the front corner of the package drops upon the inclined bed of rollers E of the elevator and slides into a position to be engaged by the elevator carrier D which has just actuated the lifting roller. The upwardly moving carrier then passes upwardly out of engagement with the curved fingers 27 of the lifting arms 26, thereby permitting the lifting roller 20 to drop below the upper edge of the package stop 19 which then operates to arrest the forward movement of the next package. The carrier of the elevator then passes through the bed of inclined rollers C and lifts the package therefrom.

It is noted as an important advantage of my invention that the length of time in which the package lifting roller 20 is held in its uppermost position is determined by the length of the curved fingers 27 of the lifting arms 26, thereby enabling the length of time that the roller remains in raised position to be varied according to the length of the packages. It is also noted that the foregoing feeding device, by reason of its simplicity, is relatively inexpensive to make, and is reliable in operation and strong enough to resist the severe conditions of practical service.

Obviously, the herein described construction admits of considerable modification without departing from the invention; therefore, I do not wish to be limited to the type of elevator or horizontal conveyor shown and described.

What I claim is:

1. The combination with an elevator comprising upwardly moving package carriers and a conveyor arranged to deliver packages into the path of said carriers, of an article stop interposed between said elevator and the discharge end of said conveyor, and means for lifting the forward end only of a package engaged with said stop high enough to pass thereover, said means comprising a roller interposed between said conveyor and said elevator and normally positioned low enough for the packages supported on said conveyor to pass above it, and a vertically swinging arm operatively connected with said roller and terminating at its free end in an upstanding finger having a convex surface disposed in the path of said carriers.

2. The combination with an elevator comprising upwardly moving package carriers and a conveyor arranged to deliver packages into the path of said carriers, of an article stop interposed between said elevator and the discharge end of said conveyor, and means for lifting the forward end of a package engaged with said stop high enough to pass thereover, said means comprising a roller normally positioned low enough for the packages supported on said conveyor to pass above it, an upwardly swinging arm pivoted below said roller and a rod connecting said roller and said arm, said arm being provided at its free end with an upstanding finger having a convex surface adapted to be engaged by the upward moving carriers to swing said arm upwardly and thereby lift said package lifting roller, the finger at the free end of said arm being sufficiently elongated to maintain the roller in raised position until the center of gravity of the package passing thereover has passed the center line thereof.

Signed at St. Louis, Missouri, this 26th day of January, 1929.

HENRY C. SANKEY.